(12) United States Patent
Beyer, Jr.

(10) Patent No.: US 7,764,954 B2
(45) Date of Patent: Jul. 27, 2010

(54) METHOD OF PROVIDING CELL PHONES IN A CELL PHONE SIGNAL STRENGTH CHART OF MULTIPLE CELL PHONES IN A COMMUNICATION NETWORK

(76) Inventor: Malcolm K. Beyer, Jr., 92 Lighthouse Dr., Jupiter Inlet Colony, FL (US) 33469-3504

( * ) Notice: Subject to any disclaimer, the term of this patent is extended or adjusted under 35 U.S.C. 154(b) by 595 days.

(21) Appl. No.: 11/670,475

(22) Filed: Feb. 2, 2007

(65) Prior Publication Data
US 2008/0102809 A1 May 1, 2008

Related U.S. Application Data

(63) Continuation-in-part of application No. 11/308,648, filed on Apr. 17, 2006, which is a continuation-in-part of application No. 11/711,490, filed on Sep. 21, 2004, now Pat. No. 7,031,728.

(51) Int. Cl.
*H04M 3/42* (2006.01)
(52) U.S. Cl. ........................ 455/416; 455/457
(58) Field of Classification Search .............. 455/452.3, 455/416, 457
See application file for complete search history.

(56) References Cited

U.S. PATENT DOCUMENTS 6,204,844 B1 * 3/2001 Fumarolo et al. ........... 715/736
6,868,337 B2 * 3/2005 Muramatsu ................. 701/211
7,313,392 B2 * 12/2007 Cheng ........................ 455/423
2005/0130634 A1 * 6/2005 Godfrey ................... 455/414.1

* cited by examiner

*Primary Examiner*—Nick Corsaro
*Assistant Examiner*—Amanuel Lebassi
(74) *Attorney, Agent, or Firm*—Malin Haley DiMaggio Bowen & Lhota, P.A.

(57) ABSTRACT

A method, a combined cellular, PDA communication device and system having specialized software applications for allowing a plurality of combined cellular phone/PDA device users to monitor each others' locations and status, to initiate cellular phone calls by touching a symbol on the touch screen display with a stylus which can also include point to call conferencing calling. Each participant's cellular phone/PDA device includes a GPS navigation receiver with application software for point to call or conference call initiation to network participants and fixed facilities. The method, device and system also include several features that: (a) provides an individual the ability to establish public or private peer to peer networks and to assign the symbols and soft switches associated with the network; (b) allow individual cell phone/PDA device users to create a signal strength geo-referenced contour map; (c) permit each network participant to automatically request and download additional constantly updated maps that surround the network participant's fixed or moving locations from a server and (d) collapse the cell phone's soft switch matrix and readout areas so that after a fixed amount of user inactivity time, the map and superimposed symbols area will increase to occupy the soft switch and read out areas.

6 Claims, 10 Drawing Sheets

METHOD OF PROVIDING CELL PHONES IN A CELL PHONE SIGNAL STRENGTH CHART OF MULTIPLE CELL PHONES IN A COMMUNICATION NETWORK

BACKGROUND OF THE INVENTION

1. Field of the Invention

A communications system using a plurality of cellular phones each having an integrated PDA and GPS receiver (cell phone device) for the management of two or more people through the use of a communications network. The method and system provide each user with an integrated handheld cellular/PDA/GPS/phone that has advanced communication software application programs (hereinafter referred to as ACS) and databases used in conjunction with a remote server that enable a user to control the user's cell phone and to remotely control other users' cellular/PDA phones, to determine with a particular user the location and cell phone strength throughout an area of each of the remote user's cell phones on a map display showing the strength of signal of each cell phone in the network, to access a server having additional maps of different geographical areas that can be downloaded to each participant when desired to supplement each user cell phone map, and to reduce the display virtual control switches and readout areas on each user's PDA display screen when there has been a lack of recent activity in order to increase the map and superimposed symbol area.

2. Description of Related Art

The purpose of a communications system is to transmit information bearing digital messages from a source, located at one point, to a user destination, located at another point some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include Global Positioning System (GPS) navigation that utilizes satellite navigation. These devices thus unite cellular phone technology with navigation information, computer information transmission and receipt of data.

The method and operation of communication devices used herein are described in U.S. Pat. No. 7,031,728 which is hereby incorporated by reference and pending U.S. patent application Ser. No. 11/308,648.

A desirable characteristic of a communications network would be to have the ability for a person to be able to set up either a public peer to peer communications network where all can access or a private peer to peer communications network where one has to have a password and/or a particular phone number.

Another desirable characteristic of a communications network would be to have a cell phone/PDA communication network that provides cell phone signal strength for a given geographical area so that it can be predetermined when cell phones are going to be in a dead or low cell phone signal strength zone.

Another desirable characteristic in a cell phone/PDA communication network would be to provide access to a server that has additional virtual maps that can be downloaded as network participants move across a virtual map display.

Another desirable characteristic would be to provide on the PDA touch screen display the ability to collapse virtual (soft) control switches and read out areas of a display and to increase the area available for display of maps and symbols.

SUMMARY OF THE INVENTION

Applicant's communication system and method described herein is embodied in the advanced communication software (ACS) application programs developed by applicant and installed in the integrated PDA/GPS cell phones (hereinafter often referred to as cell phone devices) used herein.

A plurality of cellular phone/WiFi/PDA/GPS devices each having ACS application programs and databases provides a communication network in conjunction with a remote server with the ability to: a) selectively poll each of the other PDA/GPS cell phone devices with each participant to start reporting its position and status information to all or selected users equipped with the same cellular phone/PDA software devices in the communications net so that each of the devices exchanges location, status and other information; (b) display information by touching the display screen at a remote user phone's location on the PDA display; (c) make calls to or send data to remote phones by touching their displayed symbols and selecting the appropriate soft switch; (d) layer a sufficient number of virtual switches or buttons on the PDA touch screen display to perform the above functions without overlaying the map; (e) determine on a virtual chart or map display each network participant's location and cell signal strength; (f) provide a server that can allow each cell phone participant to have access to different geographic maps and charts to supplement graphic coverage; and (g) provide, during periods of inactivity or low activity, an increase in the geographical and superimposed symbol display area on the PDA touch screen reducing the number of soft switches displayed.

The communication system and method described herein can also provide cell phone network participants the ability to receive and display virtual maps around other cell phone device network participants' symbols that are automatically updated as they move.

The system and method provides ACS software in each cell phone device in a communication network of participants that can interactively communicate with each other with a feature that, if there is no user activity, the virtual (soft) control switches and the read out area will collapse to provide more visual room for the map and superimposed symbols.

A network remote server acts as a forwarder for IP communications between any combination of cell phone/PDA clients and/or PC based clients. Network participant location, identity and status messages are sent to the server by each client. Network participant entered tracks are also sent to the server. Because this data is of interest to all the network participants, the server forwards the data received from one participant to all other participants, thus providing the information necessary for all network participants to know the identity, location and status of all other network participants.

The server also acts as a forwarder of data addressed from one participant to one or more addressed participants, thus permitting the transmission of free text, preformatted messages, photographs, video E mail and URL data from one network participant to other selected network participants.

The above functions can also be accomplished using peer to peer WiFi, WiMax or other peer to peer communications. However, for use with cellular communications and to assure the level of security that cell phone companies require, a centralized static IP routable server is used.

The IP server also fills another role of being a database from which data can be requested by network participants (i.e. maps, satellite images, and other images) or can be pushed to network participants (i.e. symbology and soft switch changes).

It is an object of this invention to enable each participant in the communications net to exchange data by reporting their locations, identity and status on the communication net.

It is an object of the communication system described herein to enable one or more users in the communication network to view on their cell phone/PDA touch screen display a virtual map that depicts cell phone signal strength in the area where the cell phone network participants have been operating.

And yet another object of the method and communication system described herein is to provide a remote server having access to virtual geographical maps and charts that can be sent from the server to each network participant and displayed on the network participant's cell phone display.

Yet still another object of this invention is to provide a communication and display system that during periods of a cell phone device user's inactivity, automatically collapses the readout and virtual (soft) control switch areas and automatically utilizes those display areas for an expanded virtual map and superimposed symbol area.

In accordance with these and other objects which will become apparent hereinafter, the instant invention will now be described with particular reference to the accompanying drawings.

PREFERRED EMBODIMENT OF THE INVENTION

A method and communication system that joins a communications network of participants using handheld cell phones having integrated PDA and GPS circuitry with ACS application programs that allow a participant having an Advanced Communications Software (ACS) equipped cell phone to activate and control other participants' remote cell phones/PDAs that contain ACS.

A remote IP server is provided that acts as a forwarder for IP communications between any combination of cell phone/PDA clients and/or PC based clients. Network participant location, identity and status messages are sent to the server by each client. Network participant entered tracks are also sent to the server. Because this data is of interest to all the network participants, the server forwards the data received from one participant to all other participants, thus providing the information necessary for all network participants to know the identity, location and status of all other network participants.

The server also acts as a forwarder of data addressed from one participant to one or more addressed participants, thus permitting the transmission of free text, preformatted messages, photographs, video E mail and URL data from one network participant to other selected network participants.

Figure 1A:
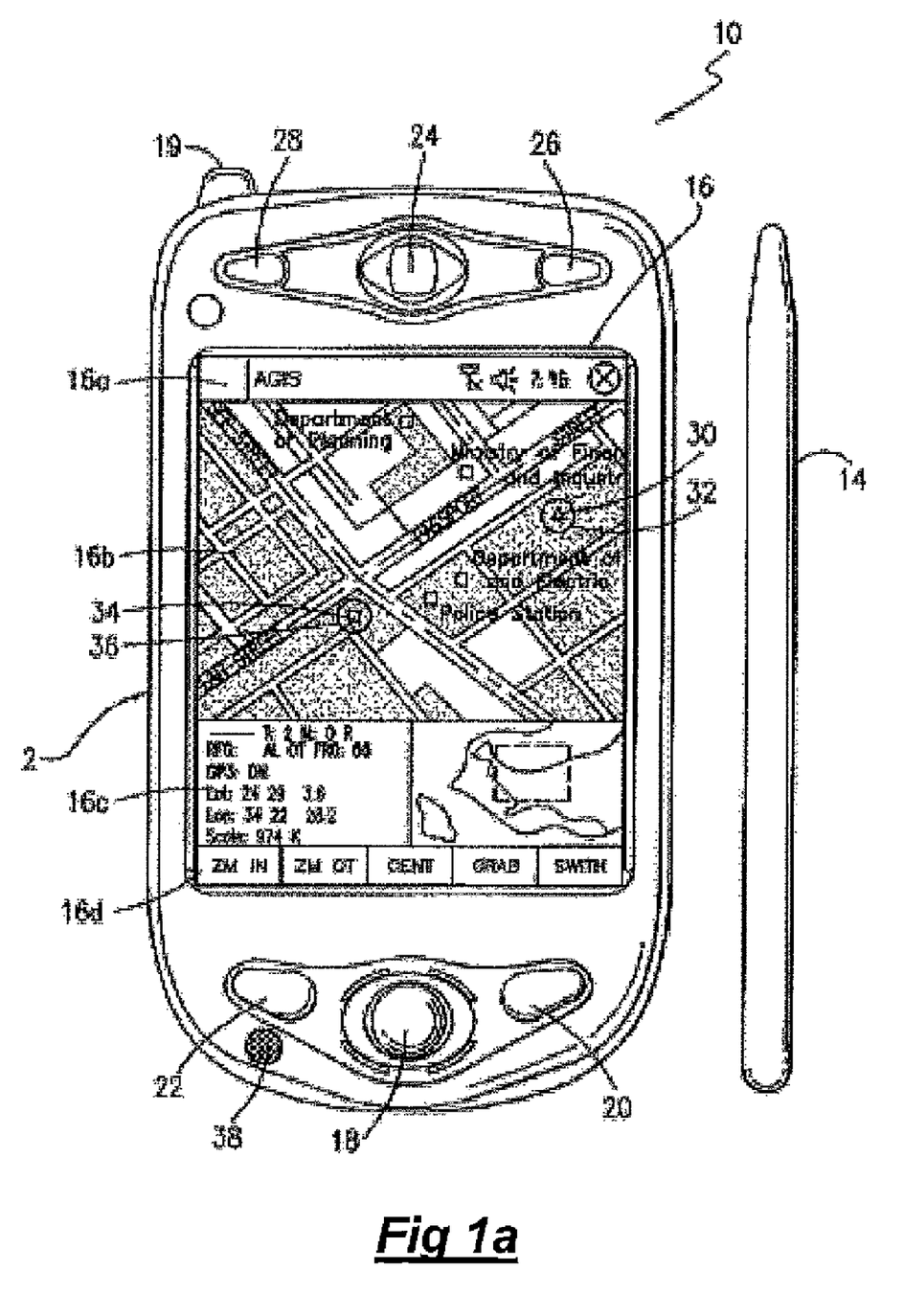
FIG. 1a shows a front plan view of a cellular phone/PDA/GPS having a touch screen.
Figure 1B:
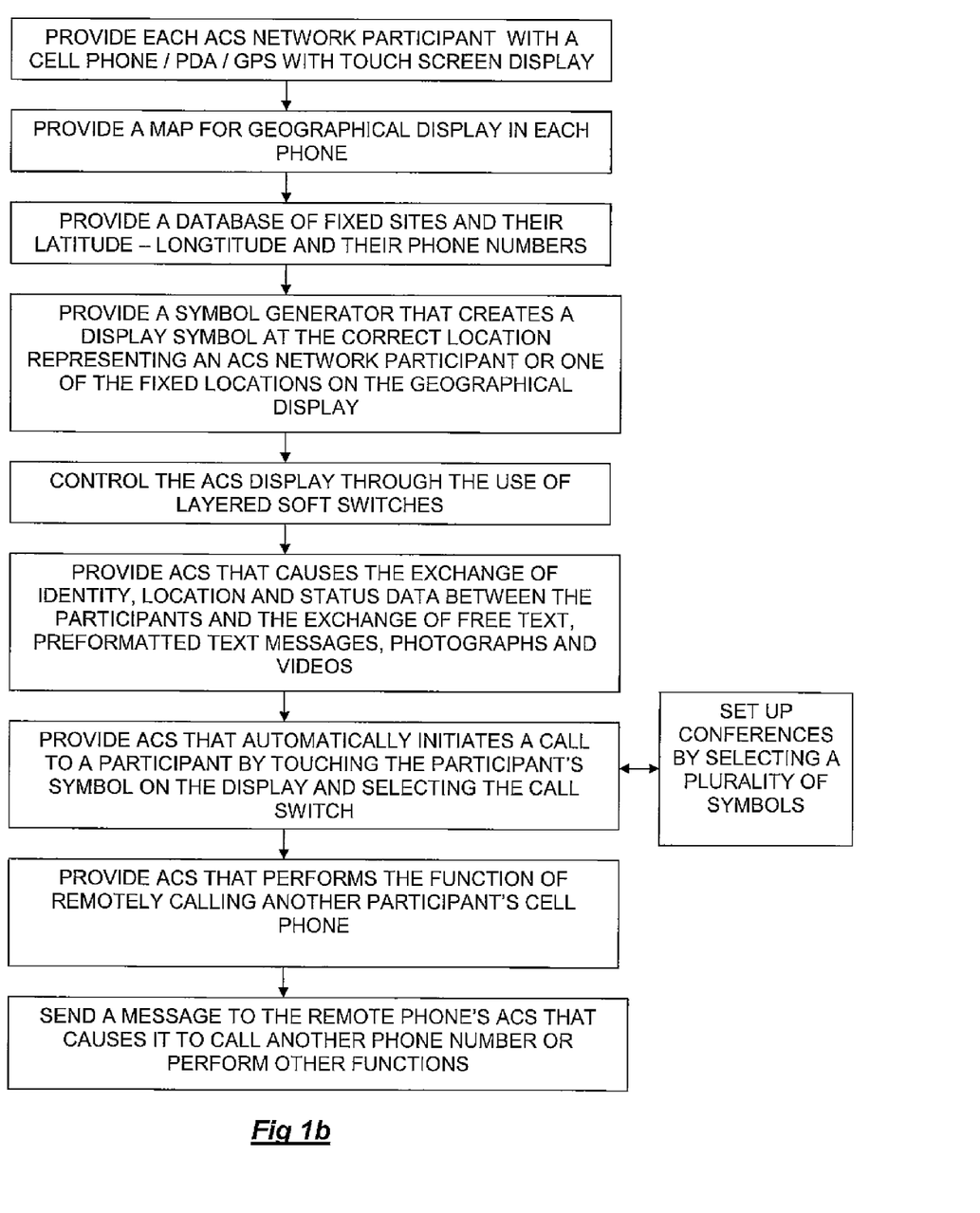
FIG. 1b shows a flow chart of the cell phone/PDA/GPS network operation.

Referring now to the drawings and, in particular, FIG. 1a and FIG. 1b, a small handheld cellular phone 10 is shown that includes a personal digital assistant (PDA) and a global positioning system (GPS) receiver communications device integrated in housing 12 that includes an on/off power switch 19, a microphone 38, and an LCD display 16 that is also a touch screen system. The small area 16a is the navigation bar that depicts the telephone, GPS and other status data and the active software. Each cell phone includes a CPU and databases that store information useful in the communication network. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 16d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. Conventional PDA/cellular phones are currently on sale and sold as a unit (or with an external connected GPS) that can be used for cellular telephone calls and sending cellular SMS and TCP/IP or other messages using the PDA's display 16 and computer (CPU). The GPS system including a receiver in housing 12 is capable of determining the latitude and longitude and, through SMS, TCP/IP, WiFi or other digital messaging software, to also transmit this latitude and longitude information of housing 12 to other cellular phones in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select a user specified network software program. Speaker 24 and microphone 38 are used for audio messages. Switch 19 at the top left of device 10 is the power on and power off switch for the entire device.

The heart of the invention lies in the applicant's ACS application programs provided in the device. The ACS programs are activated by clicking on an icon on the display to turn the ACS programs on or off. Mounted within housing 12 as part of the PDA is the display 16 and the CPU. The internal CPU includes databases and software application programs that provide for a geographical map and geo-referenced entities that are shown as display portion 16b that includes as part of the display various areas of interest in the particular local map section.

When looking at display 16, the software switches (soft switches) which appear at the very bottom of the display 16d are used to control by touch many of the software driven functions of the cellular phone and PDA. The soft switches are activated through the user's use of the navigation pad 18, or a small track ball, force stick or similar hardware display cursor pointing device. Alternatively, the user may choose to activate the software switches by touching the screen with a stylus 14 (or finger) at the switches' 16d locations. When some of the software switches are activated, different software switches appear. The bar display 16d shows the software switches "ZM IN (zoom in)," "ZM OT (zoom out)," "CENT (center)" and "GRAB (pan/grab)" at the bottom of the screen. These software switches enable the user to perform these functions. The "SWITH (switch)" software switch at the lower right causes a matrix of layered software switches (soft switches) to appear above the bottom row of switches. Through use of the software switches, the user can also manipulate the geographical map 16b or chart display. When looking at FIG. 1a, display symbols, depicting permanent geographical locations and buildings, are shown. For example, the police station is shown and, when the symbol is touched by the stylus or finger, the latitude and longitude of the symbol's location, as shown in display section 16c, is displayed at the bottom left of the screen. The bottom right side of display 16c is a multifunction inset area that call contain a variety of information including: a) a list of the communication link participants; b) a list of received messages; c) a map, aerial photograph or satellite image with an indication of the zoom and offset location of the main map display, which is indicated by a square that depicts the area actually displayed in the main geographical screen 16b; d) applicable status information; and e) a list of the communication net participants. Each participant user would have a device 10 shown in FIG. 1a.

Also shown on the display screen 16, specifically the geographical display 16b, is a pair of different looking symbols 30 and 34, a small triangle and a small square, which are not labeled. These symbols 30 and 34 can represent communication net participants having cellular phones in the displayed geographical area that are part of the overall cellular phone communications net, each participant having the same device 10 used. The latitude and longitude of symbol 30 is associated within a database with a specific cell phone number and, if available, its IP address and email address. The screen display 16b, which is a touch screen, provides x and y coordinates of the screen 16b to the CPU's software from a map in a geographical database. The software has an algorithm that relates the x and y coordinates to latitude and longitude and can access a communications net participant's symbol or a fixed or movable entity's symbol as being the one closest to that point.

In order to initiate a telephone call to the cellular phone user (communication net participant) represented by symbol (triangle) 30 at a specific latitude and longitude display on chart 16b, the operator touches the triangle 30 symbol with the stylus 14. The operator then touches a "call" software switch from a matrix of displayed soft switches that would overlay the display area 16c. Immediately, the cellular phone will initiate a cellular telephone call to the cellular phone user at the geographical location shown that represents symbol 30. A second cellular phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

The user can call the police station or any other specific geographical facility displayed on the map, including: buildings, locations of people, vehicles, facilities, restaurants, or other entities, whose cellular phone numbers and, if available, E-mail addresses, IP addresses and their URLs were previously stored in the database by touching a specific facility location on the map display using the stylus 14 and then touching the cellular phone call switch. As an example, the user can touch and point to call a restaurant using a soft switch by touching the restaurant location with a stylus and then touching the call soft switch. The cellular phone will then call the restaurant. Thus, using the present invention, each participant can touch and point to call to one or more other net participants symbolically displayed on the map, each of whom has a device as shown in FIG. 1a and can also point to call facilities that had been previously stored in the phone's database. Furthermore, this symbol hooking and soft switch technique can be used to go to a fixed facility's website or to automatically enter the fixed facility's E mail address in an e-mail.

Each cellular phone/PDA/GPS user device is identified on the map display of the other participant user phone devices by a display symbol that is generated on each user phone display to indicate each user's identity. Each symbol is placed at the correct geographical location on the user display and is correlated with the map on the display. The operator of each cellular phone/PDA/GPS device may also enter one or more other fixed entities (buildings, facilities, restaurants, police stations, etc.) and geo-referenced events such as fires, accidents, etc., into its database. This information can be likewise transmitted to all the other participants on the communications net. The map, fixed entities, events and cellular phone/PDA/GPS device communication net participants' latitude and longitude information is related to the "x" and "y" location on the touch screen display map by a mathematical correlation algorithm.

When the cellular phone/PDA/GPS device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant police station or a new entity observed by a cell phone user which is discussed below or fixed locations obtained from a database, the operator points at or near the location of a geo-referenced symbol appearing on the cellular phone/PDA display that represents a specific track or specific participant or other entity. The hook application software determines that the stylus is pointed close to or at the location of the symbol and puts a circle, square or other indication around the symbol indicating that amplification information concerning the symbol is to be displayed and indicating that additional data or change in data can be made to the indicated symbol. The hook application code then sends a message to the display application code to display the net participant, facility or entity's amplifying data. The display application code retrieves the primary data and amplification data concerning the symbol or entity from the database and displays the information at the correct screen location. The user can then read the amplification data that relates to that specific symbol at the specific location. The cell phone user can also select soft switches on the touch screen display to change the primary data and amplification data. Furthermore, the user can use a similar method of hooking and selecting to activate particular soft switches to take other actions which could include: making cellular phone calls, conference calls, 800 number calls; sending a free text message, operator selected preformatted messages, photographs or videos to the hooked symbol; or to drop a entered symbol.

Each known net participant has a cellular phone number, IP address and, if available, E-mail address that is stored in each participant's device database.

To use the communication system, the user starts the PDA/cellular phone device system by selecting the cell phone and network software which causes: a) the cellular phone to be activated (if it has not already been activated); b) the GPS interface receiver to be established; c) a map of the geographic area where the operator is located and operator's own unit symbol to appear at the correct latitude and longitude on the map on the display; d) the locations of fixed facilities such as restaurants, hotels, fire departments, police stations, and military barracks, that are part of the database, to appear as symbols on the map; e) the device selected item read out area which provides amplification information for the communications net participants or the entity that has been hooked (on the display screen) to appear on the display; f) an insert area that contains various data including: the list of net participants, a list of messages to be read, an indication of what portion of the map is being displayed in the major map area and other information to appear on the display; and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or for, VoIP calls, an IP address) from the database. Upon receiving a "call" designation from the soft switch, the user's device's ACS causes the appropriate phone number or IP number to be called. Upon receiving an indication that the phone number is being called, the application code places a box around the symbol (color, dashed or the like). When the call is connected, the box changes to indicate that the connection is made. When the other party hangs up, the box disappears.

As each of the cell phone participants reports its identity, location and status to the other participants' devices, the received data is geo-referenced and filed in their databases that are accessible by identity and by location. This data is then displayed on each cell phone display. When a request for data is received by touching the display screen, a location search is made by the ACS and a symbol modifier (circle, square, etc.) is generated around the symbol closest to the x, y position of the stylus. When the application code receives a soft switch command to place a phone call or send data, the software uses the phone number (or IP address) associated with the unit to place the call or to send data.

If a cell phone device receives a digital message that a call is being received, the receiving cell phone's ACS application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are participants and each one has a similar device with the same software for use as a total participant network. Other situations for calling facilities that are not part of the network are described below.

Thus, the user device is capable of initiating a cellular phone call by touch only, and initiating conference calls by touching the geo-referenced map symbols. Furthermore, by using a similar symbol touching technique, a cellular phone can send user selected messages to cause a remote cellular phone to display and optionally announce emergency and other messages and to optionally elicit a response from the remote cellular phone.

All of the network participants have the same communication cell phone/PDA/GPS devices described herein (cell phone devices). The method and system include the ability of a specific user device to provide polling in which other cellular phones, using SMS, internet or WiFi, report periodically based on criteria such as time, speed, distance traveled, or a combination of time, speed and distance traveled. The user can manually poll any or all of the cell phone devices that are used by all of the participants in the communication network having the same devices. The receiving cellular phone application code responds to the polling command with the receiving cellular phone's location and status, which could include battery level, GPS status, signal strength and entered track data. Optionally, the phone users can set their phones to report automatically, based on time or distance traveled intervals or another criterion.

The virtual (soft) control switch application software causes a visual display of a matrix such as five across by six up (or another matrix) in which switch names are placed on the cellular/PDA display. The soft switch network application software knows the touch screen location of each of the switches in the matrix and the software routines that will be activated upon touching the switch.

The bottom row of soft switches displayed on the touch screen remains visually fixed. These soft switches concern the functions that are the most often used. One of the soft switches causes a matrix of other soft switches to appear above the visually fixed soft switches. These switches are function virtual switches, the activation of any one of which causes a different matrix of soft switches to appear, which are known as the action soft switches. When the action soft switches appear, the function soft switch, which caused the action soft switches to appear, itself appears as a label in the lower left (or some other standard location) indicating to the user the function soft switch that has been selected. When the user selects an action soft switch, the appropriate application software to accomplish the action is activated.

FIG. 1b shows a flow chart of some of the important functions of the cell phone device having ACS by a network participant.

Upon receiving a soft switch activation message, the ACS software accesses the appropriate task execution software which accomplishes the required tasks including: entry of track data, entry of track amplification data, transmission of alpha/numeric messages, photographs, videos, display of messages to be read, selection of map types, placing voice calls, placing conference calls and 800 conference calls, presenting different potential user selections, control of the display actions, polling network participants, establishing nets of participants (groups) so that communications with all in the group can be accomplished with a single soft switch action, and dropping a previously entered track. By providing a matrix and layers of soft switches which are easily manipulated by a stylus, each cell phone device in the communication network is extremely efficient in accessing and coordinating the appropriate application program for the device to perform.

Figure 2A:
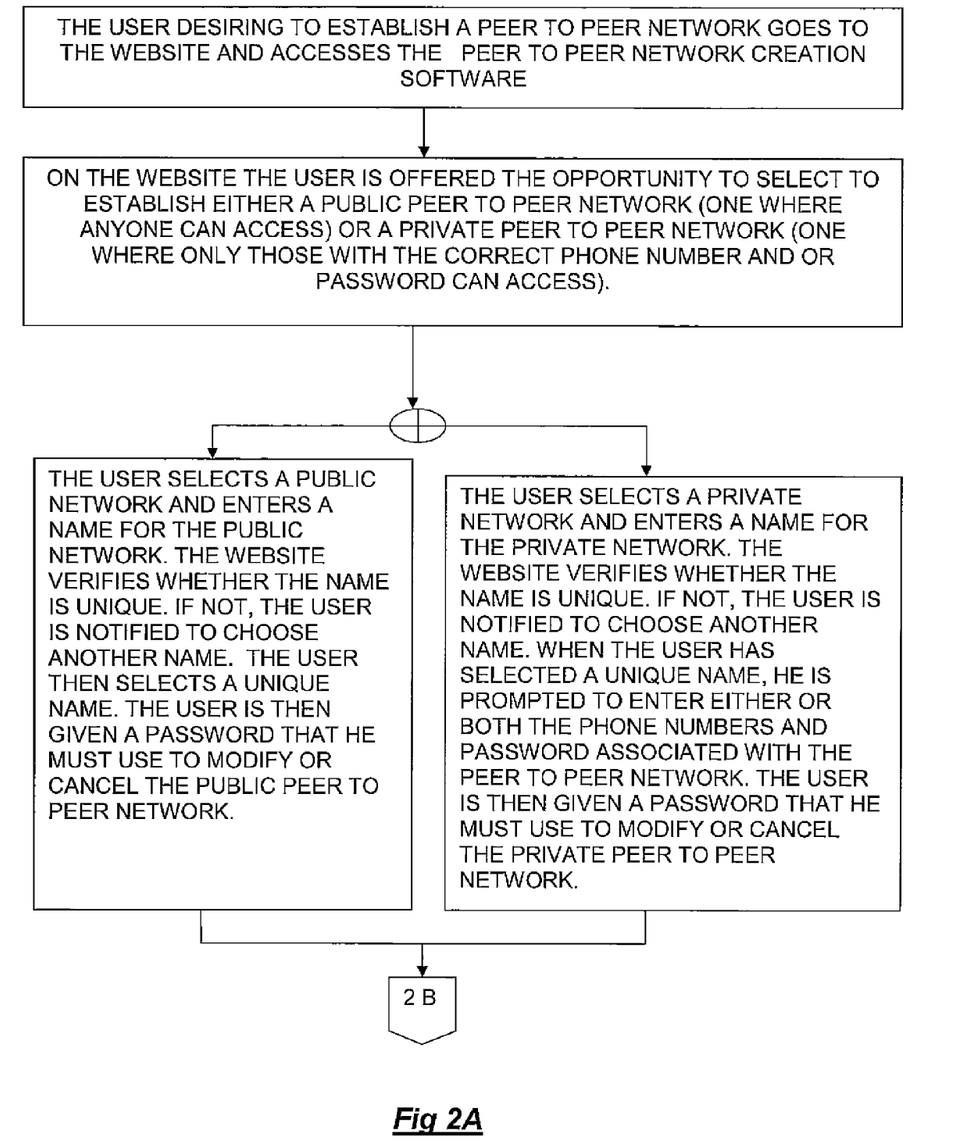
FIGS. 2A, 2B and 2C show a single flow chart of a user establishing peer to peer networks.
Figure 2B:
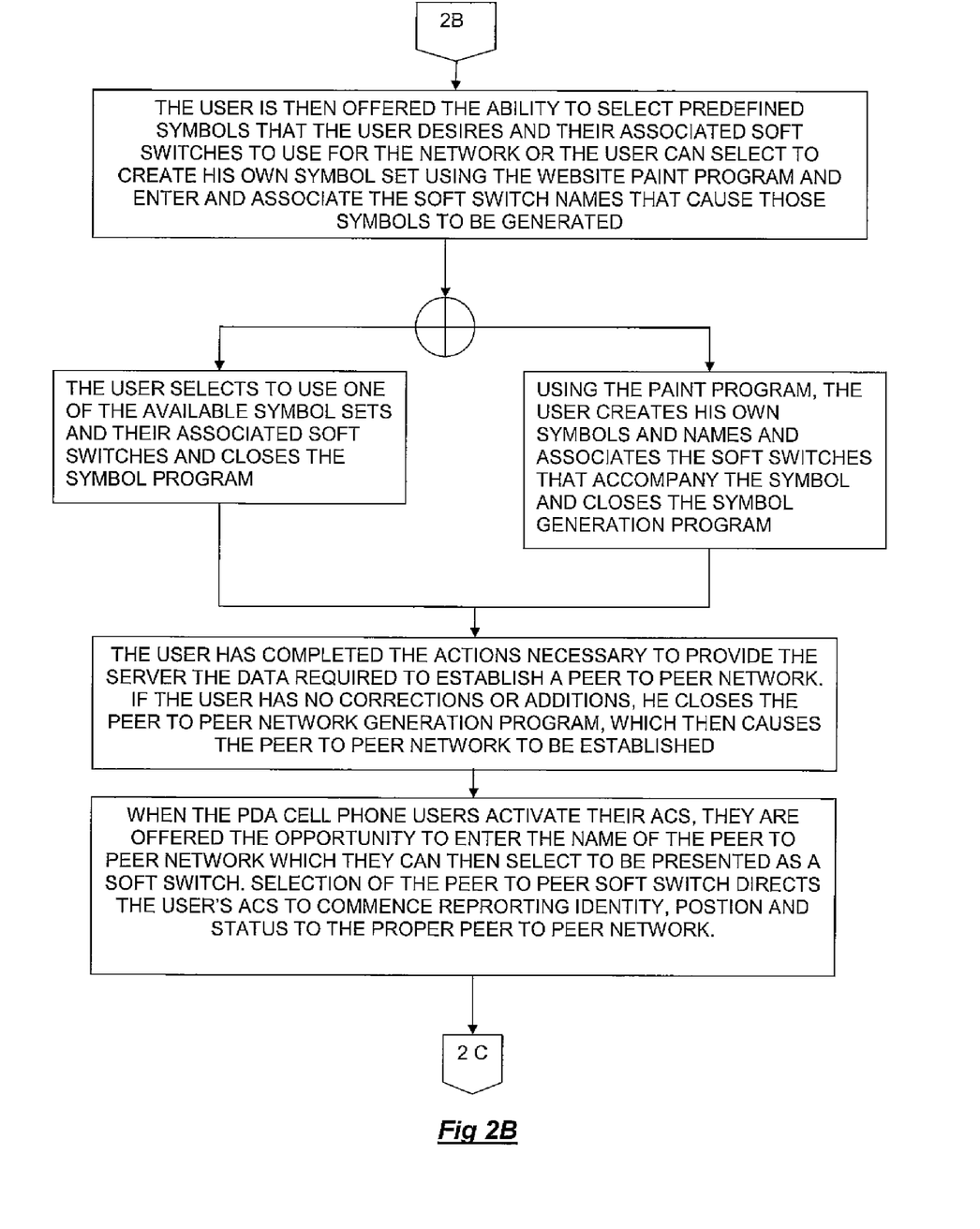
Figure 2C:
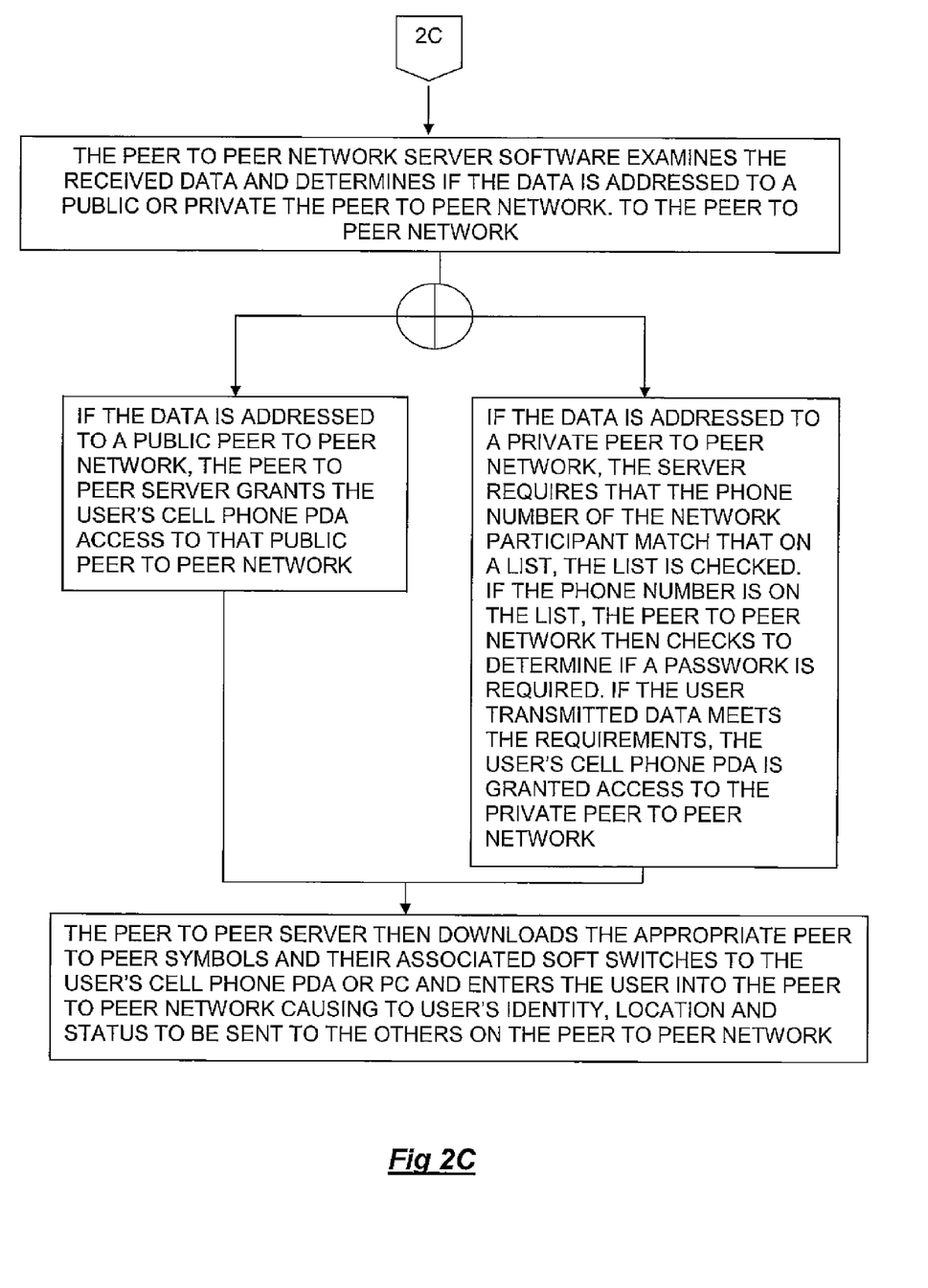

The single flow chart in FIGS. 2A, 2B and 2C show the creation of the peer to peer networks in detail.

As described in FIG. 2A, the user with a cell phone device desiring to establish a peer to peer network visits the ACS server website and accesses the peer to peer network creation software.

On the website, the user is offered the opportunity to select to establish either a public peer to peer network (one where anyone can access) or a private peer to peer network (one where only those with the correct phone number and/or password can access).

In one option, the user can select a public network and enter a name for the public network. The website verifies whether the name is unique. If not, the user is notified to choose another name. The user then selects a unique name and is then offered the opportunity to select the user's own symbol and soft switch name.

Alternatively, the user can select a private network and enter a name for the private network. The website verifies whether the name is unique. If not, the user is notified to choose another name. When the user has selected a unique name, the user is prompted to enter either or both the phone numbers and password associated with the peer to peer network. The user is then given a password that the user must use to modify or cancel the private peer to peer network.

Looking at FIG. 2B, for either peer to peer network, the user is then offered the ability to select predefined symbols that the user desires and their associated soft switches to use for the network or the user can select to create his own symbol set using the website paint program and enter and associate the soft switch names that cause those symbols to be generated.

The user selects to use one of the available symbol sets and their associated soft switches and closes the symbol program.

Using the paint program, the user creates his or her own symbols and names and associates the soft switches that accompany the symbol and closes the symbol generation program.

The user has completed the actions necessary to provide the server the data required to establish a peer to peer network. If the user has no corrections or additions, the user closes the peer to peer network generation program, which then causes the peer to peer network to be established.

When users activate their ACS software programs in the cell phone devices, the users are offered the opportunity to enter the name of the peer to peer network which the users can then select in order to be presented with as a soft switch selection. The peer to peer soft switch directs the user to the proper peer to peer network.

Referring to FIG. 2C, the peer to peer software examines the received data and determines if the peer to peer network requires that the phone number of the network participant match that on a list, the list is checked. If the phone number is on the list, the peer to peer network checks to determine if a password is required. If the user transmitted data meets the requirements, the user's cell phone device is granted access to the peer to peer network.

The peer to peer server then downloads the appropriate peer to peer symbols and their associated soft switches to the user's cell phone device or PC and enters the user into the peer to peer network.

Figure 3:
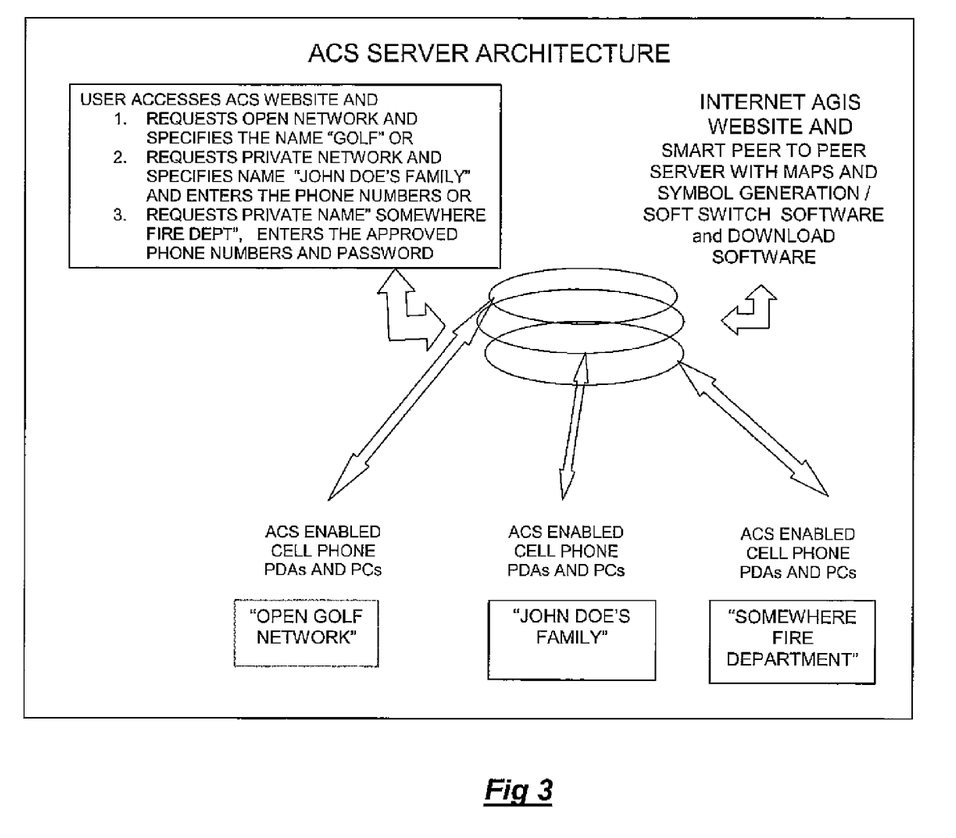
FIG. 3 shows a flow chart of how the ACS server interacts with the ACS cell phone/PDAs and PCs.

The flow chart in FIG. 3 shows that a network system website can be connected to an ACS server in a manner that permits a cell phone device user accessing the system website to create either a public peer to peer network where all cell phone device users that specify a common interest can access (i.e. golf) or private peer to peer networks where the access to the network is limited to those with a specific phone number (John Doe's family) or phone number and password (Somewhere Fire Department). The website further contains a Microsoft type "paint" program and a soft switch naming program that permit the user to access existing symbols or create new symbols to be associated with ACS software that can be downloaded from the website.

Figure 4:
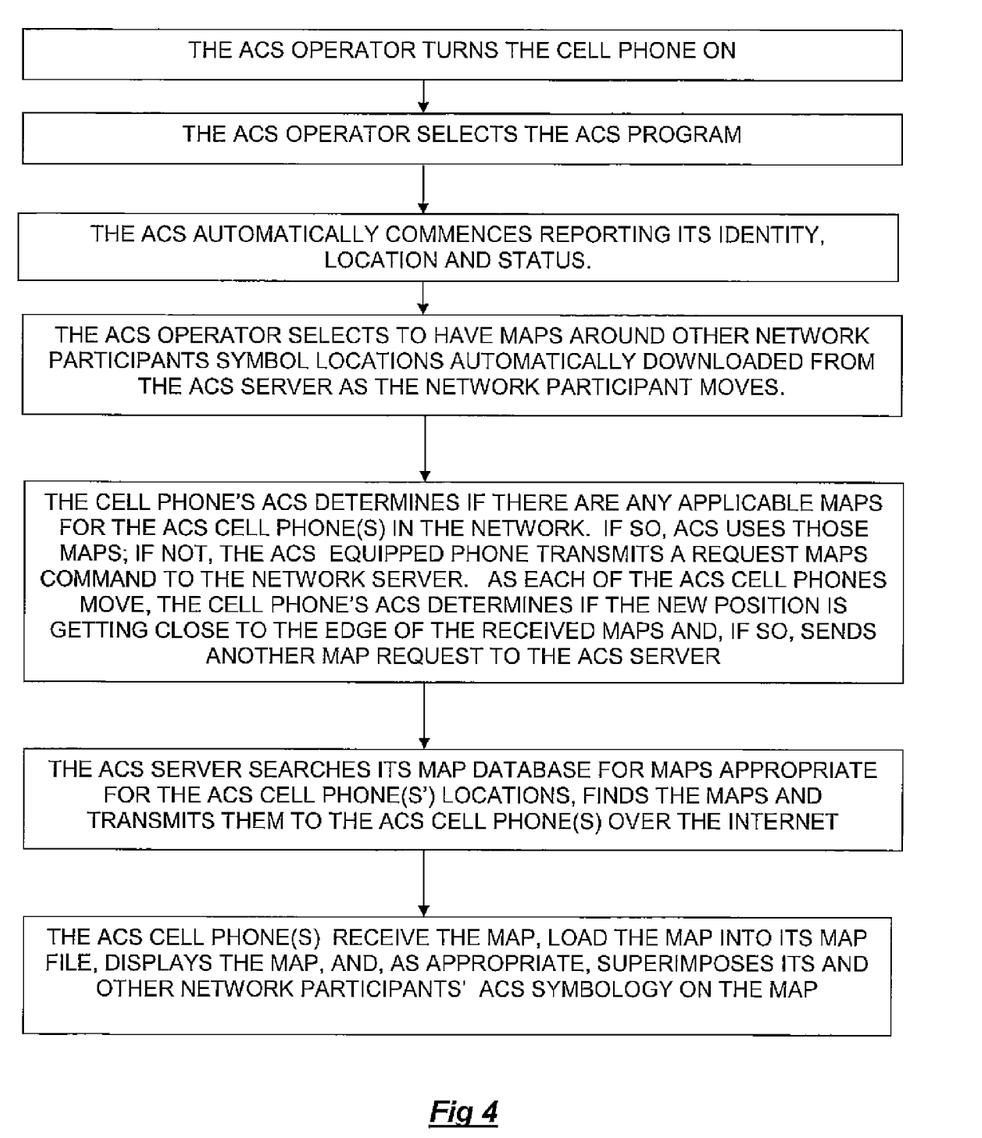
FIG. 4 shows a flow chart of a method providing for the automatic requesting and display of virtual maps surrounding moving network participants.

The flow chart in FIG. 4 shows that each cell phone/PDA equipped with ACS software (cell phone device) can have its own map database. A remote system server has a database of the entire geographical area where the PDA cell phone participants operate and is receiving the GPS or entered location of each cell phone and the location of any symbol entered by the cell phone operator. When the cell phone device operator moves, the ACS software checks to determine if maps are available for the surrounding area in its local database and, if not, sends a request to the server to download the maps surrounding its location. When the cell phone device operator enters or hooks a track outside of its database map area, its ACS determines if there are maps surrounding that location. If not, the cell phone device ACS software sends a request to the server to download the maps surrounding that area. If maps are not available from its local data base, as the hooked symbols move, the maps surrounding their locations are continuously requested, downloaded, stored and displayed on the cell phone device. While this technique of map distribution currently would take a large amount of time, cellular data rates are rapidly increasing to the extent that it will soon be practical. Having automatic access to the remote map server through an internet connection that includes the database with all of the geographical charts and maps greatly reduces the amount of data that has to be stored on each user cell phone device system in the network. The flow diagram which represents the ability of the user to automatically download additional maps for the user's location and the other participants in the network, as they move from the server over the internet, is shown in FIG. 4.

Figure 5:
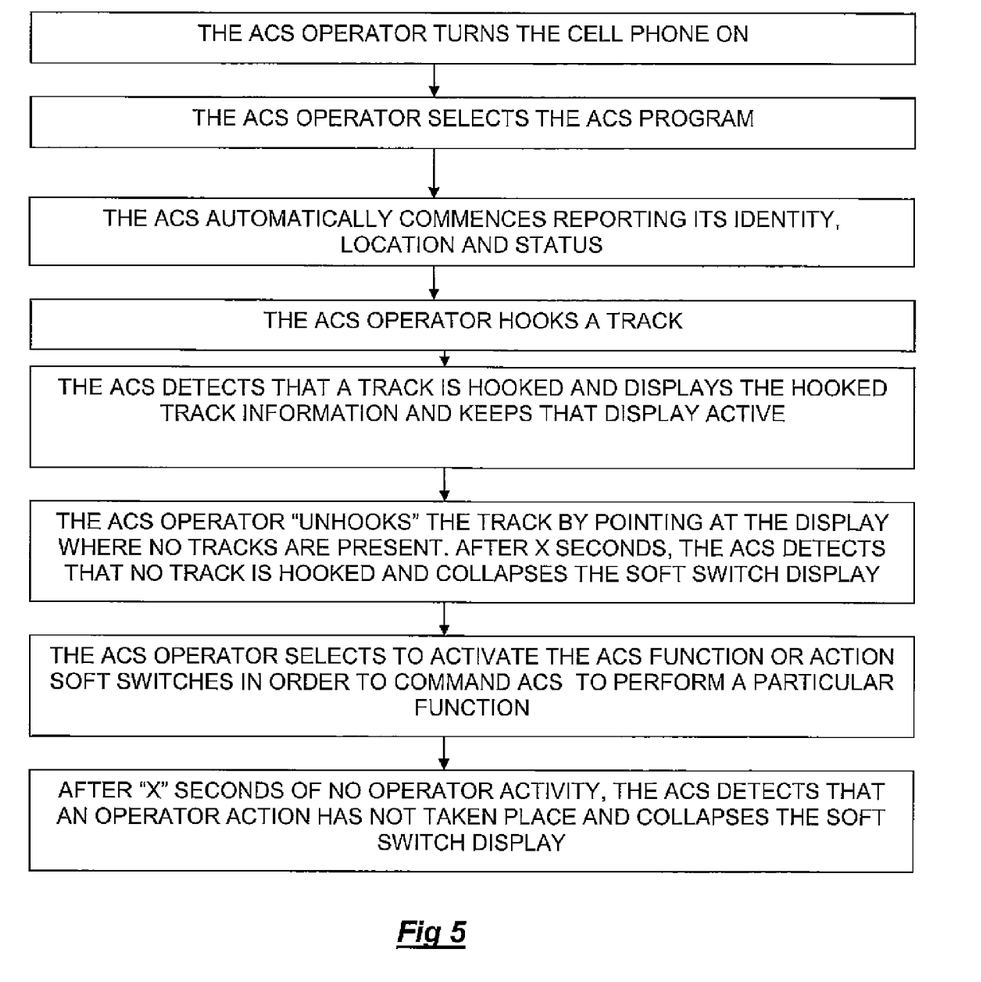
FIG. 5 shows a flow chart of a method for the automatic collapsing of a virtual (soft) control switch matrix and readout areas if no operator actions have taken place in a predetermined time period.

FIG. 5 shows a flow chart of a method for the automatic collapsing of a virtual (soft) switch matrix if a symbol is not hooked or no soft switch actions have taken place in a predetermined time period. Since the individual handheld cell phone device display screens are small, display screen area is at a premium. The individual user cell phone device ACS software can monitor when there are no symbols that are hooked or when there is no user activity during prescribed time periods. If these conditions are met, the individual user cell phone device can collapse the ACS soft switches down to the primary fixed level soft switches thus greatly reducing the area on the touch screen display taken by the soft switches and increasing the area available for display of maps and superimposed symbols. Having an automated system in the ACS program in each handheld cell phone device for expanding or maximizing the geographical screen area display is valuable for increasing the effectiveness of operations that are confined to the small useable display area in each cell phone device, especially for viewing geographical areas showing maps and charts.

In order to provide the maximum display screen area, the cell phone device automatically collapses the virtual soft switches down to just the fixed soft switches when no symbol is hooked or a user action has not taken place in a predetermined time period. This technique provides the cell phone user with the maximum map and symbol area on the display possible when the ACS readout and the soft switch control mechanisms are not in use.

Figure 6:
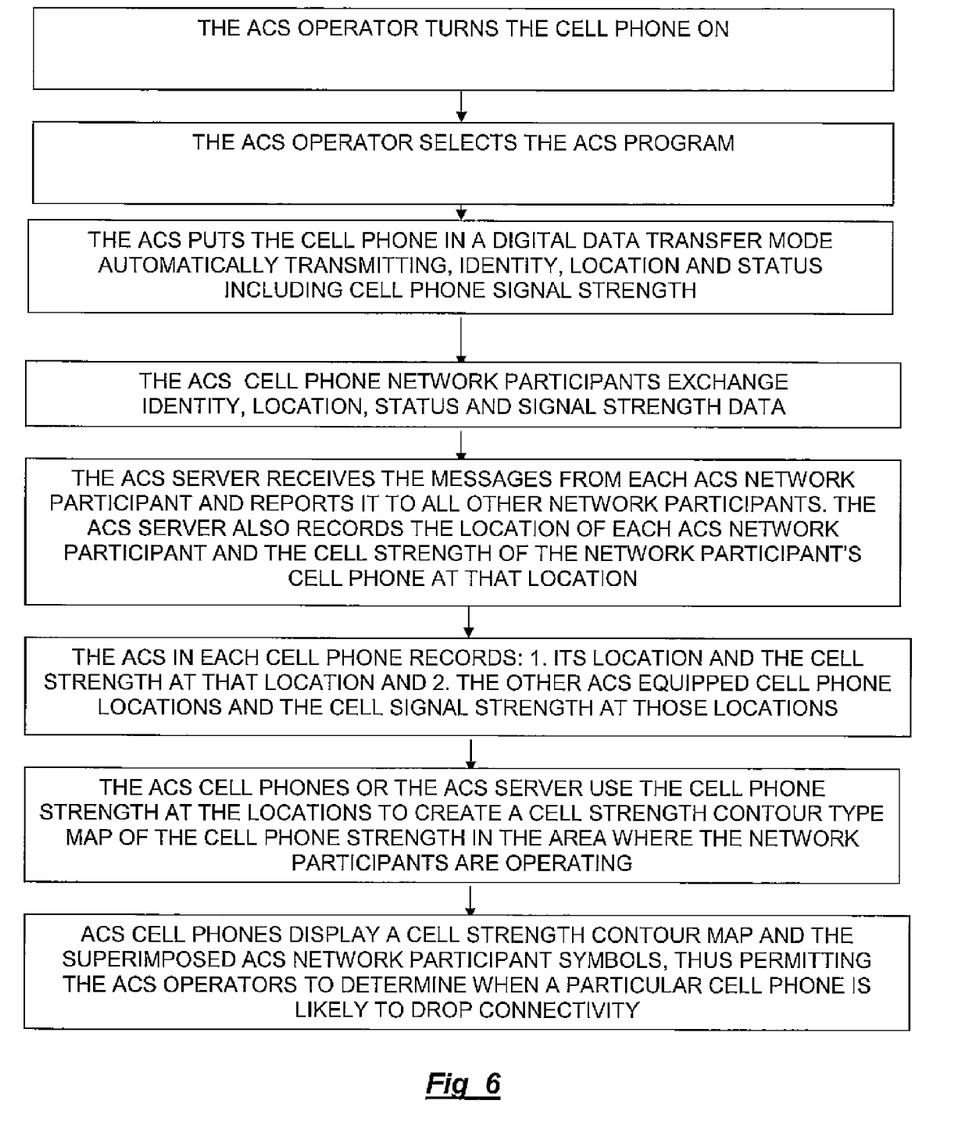
FIG. 6 shows a flow chart of a method for the automatic creation of a cell strength virtual map based on previous network participant location and status (i.e. their cell strength) reports.

FIG. 6 shows a flow chart of a method for the automatic creation of a graph, chart or map indicating cell strength that is based on receiving network participants' locations and their cell strength reports over a length of time.

Figure 7:
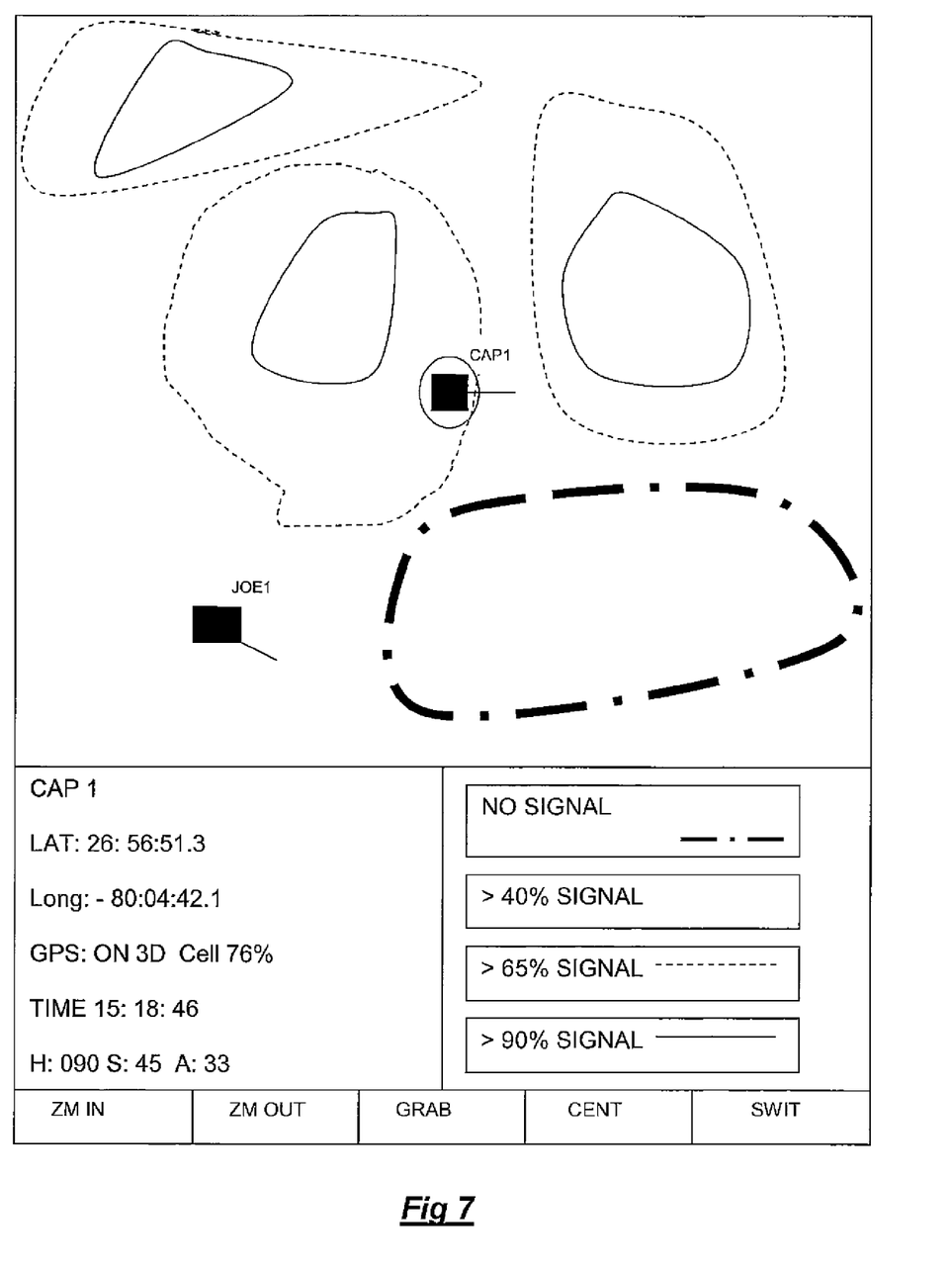
FIG. 7 shows a schematic diagram of a PDA display screen on a cell phone or other type display that shows geographical areas and the relative cell phone signal strength within that area based on information previously received from other cell phone device participants in the area from their cell phone devices.

Referring now to FIG. 6 and FIG. 7, embedded in each cell phone device is an ACS program connected to the cell phone device CPU. The cell phone device ACS reports its cell phone identity, location, and cell strength to the ACS network server. The ACS server then reports the cell phone identity, location, and cell strength to all participants in the network. The ACS in each operator's CPU receives digital messages from the other network participants' cell phone devices indicating their geographical locations and quantitative indications of the signal strength at each cell phone device location. This location and signal strength data can be processed in the same manner as location and altitude information is processed to create a cell strength contour map of an area. Thus, on each of the network participants' displays, the signal strength in an area of the map can be represented as shown in FIG. 5. The network participants report by time, distance traveled or when polled. As the cell phone devices move, the devices provide a constantly updated indication of signal phone strength at different points. The network server and each of the cell phone device record and retain all the network participants' past locations and signal reception strength at those locations. The recording of these locations and signal strengths can then be used to create a near real time signal strength contour map (FIG. 7) in the area that is being traversed by the ACS enabled cell phone devices in much the same manner as altitude data are used to create geographic map contour lines. FIG. 7 shows a typical signal strength map with contour lines (dotted, dashed and solid lines) enclosing different signal strength values.

The communication network system and methods described herein convey a cell phone device network that can utilize a remote server to provide critical information such as additional geographical maps of each individual user location as they move and maps of cell phone strengths within a geographical area. The cell phone device software described herein can, if there is no user activity, collapse the cell phone device's soft switch and the read out areas and adjust the map and superimposed symbol areas to occupy the available space.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of providing a cellular phone communication network for designated participating users, each user having a similarly equipped PDA/cell phone that includes a CPU and a GPS navigational system for a touch screen display;

establishing a rapid voice call initiation communication among the users of the cell phone/PDA/GPS network system using a touch screen;

providing each cellular/PDA/GPS phone with a software application program and database that permits each cell phone user to continuously know each other cell phone user's geographical location and status which is displayed on the touch screen display of each cell phone;

displaying on each cell phone display one or more symbols representing the users in the network having similarly equipped cell phones that transmit the geographical location upon request, distance traveled, or other criteria to the users in the network periodically so that each cell phone user has a touch display with symbols representing the other users in the network geographically;

transmitting from a remote network server that can communicate with each cell phone/PDA in said communications network additional maps to each user's cell phone, said server including a database that contains additional maps not available on each user's cell phone database that can be downloaded by each cell phone/PDA by communicating with the server;

accessing with a remote network server from a system website for the purpose of establishing either public or private networks that can then enable those who have accessed the website the ability to define public and private peer to peer, networks each with its own symbols and soft switches; and communicating additional maps from a remote network server that can communicate with each cell phone/PDA in said communications network, said server including a database that contains additional maps not available on each user's cell phone database that are automatically downloaded to each cell phone/PDA through communication with the server by entering a symbol or hooking a symbol or hooking a moving symbol in an area where maps are not contained in its local database for the stationary or moving symbol.

2. A method of providing a cellular phone communication network for designated participating users, each user having a similarly equipped PDA/cell phone that includes a CPU and a GPS navigational system for a touch screen display;

establishing a rapid voice call initiation communication among the users of the cell phone/PDA/GPS network system using a touch screen;

continuously transmitting geographical locations and status from each cellular/PDA/GPS phone with a software application program and database that permits each cell phone user to continuously know each other cell phone user's geographical location and status which is displayed on the touch screen display of each cell phone;

displaying on each cell phone display one or more symbols representing the users in the network having similarly equipped cell phones that transmit the geographical location upon request, distance traveled, or other criteria to the users in the network periodically so that each cell phone user has a touch display with symbols representing the other users in the network geographically;

displaying a soft switch matrix including a plurality of soft switches in each touch screen display of each cell phone and user network that includes initiating rapid voice call to any other user in the network through touching the first voice call switch after hooking a specific symbol or symbols that automatically calls the symbols touched at the location; and collapsing the soft switch matrix to increase cell phone map display area so that when symbols are not hooked or the operator is not taking soft switch actions for a fixed time period, the soft switches collapse down to a single row of fixed soft switches thus providing the maximum size map for observation for participant's PDA display.

3. A method of providing a cellular phone communication network for designated participating users, each user having a similarly equipped PDA/cell phone that includes a CPU and a GPS navigational system for a touch screen display;

establishing rapid voice call initiation communication among the users of the cell phone/PDA/GPS network system using a touch screen;

continuously transmitting geographical locations and status of each cellular/PDA/GPS phone with a software application program and database that permits each cell phone user to continuous know each other cell phone user's geographical location and status which is displayed on the touch screen display of each cell phone;

displaying on each cell phone display one or more symbols representing the users in the network having similarly equipped cell phones that transmit the geographical location upon request, distance traveled, or other criteria to the users in the network periodically so that each cell phone user has a touch display with symbols representing the other users in the network geographically; and creating and displaying a cell phone reception signal strength geo-referenced contour map by collecting and storing the network participant's location and area signal strength data that is being or has been transmitted between network participants and using the signal strength data to display a signal strength contour graph, chart or map on each cell phone display so that network participants can view their locations and signal strengths on said display maps on each cell phone.

4. A method as in claim 1 that substitutes the use of IP WiFi or similar communications that does not require a server which is necessary with cellular phones due to the fact that cellular phones do not have static IP addresses but do have a fixed Media Access Control Address.

5. A method as in claim 2 that substitutes the use of IP WiFi or similar communications that does not require a server which is necessary with cellular phones due to the fact that cellular phones do not have static IP addresses but do have a fixed Media Access Control Address.

6. A method as in claim 3 that substitutes the use of IP WiFi or similar communications that does not require a server which is necessary with cellular phones due to the fact that cellular phones do not have static IP addresses but do have a fixed Media Access Control Address.

* * * * *